US008706147B2

(12) United States Patent
Couse et al.

(10) Patent No.: US 8,706,147 B2
(45) Date of Patent: Apr. 22, 2014

(54) METHOD, SYSTEM AND APPARATUS FOR ENHANCING DIGITAL VOICE CALL INITIATION BETWEEN A CALLING TELEPHONY DEVICE AND A CALLED TELEPHONY DEVICE

(75) Inventors: Peter Francis Couse, Ottawa (CA); Ron Wellard, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1339 days.

(21) Appl. No.: 12/456,782

(22) Filed: Jun. 22, 2009

(65) Prior Publication Data
US 2010/0322399 A1 Dec. 23, 2010

(51) Int. Cl.
G06F 15/16 (2006.01)
H04M 3/42 (2006.01)
H04M 11/10 (2006.01)
H04W 4/00 (2009.01)
H04M 1/663 (2006.01)

(52) U.S. Cl.
USPC ........ 455/466; 455/415; 455/413; 455/412.2; 379/207.15; 379/88.13; 379/88.17; 379/88.2; 379/88.27; 379/142.06; 709/206

(58) Field of Classification Search
USPC .................. 455/415, 413, 466, 412.1, 412.2; 379/207.15, 88.13, 88.17, 88.2, 88.27, 379/142.06; 709/206
See application file for complete search history.

(56) References Cited

U.S. PATENT DOCUMENTS

| 5,937,051 | A | 8/1999 | Hurd et al. |
| 6,704,582 | B2 * | 3/2004 | Le-Faucheur et al. ........ 455/567 |
| 6,775,360 | B2 * | 8/2004 | Davidson et al. .......... 379/88.14 |
| 6,853,710 | B2 | 2/2005 | Harris |
| 7,286,658 | B1 * | 10/2007 | Henderson ............... 379/142.04 |
| 7,613,450 | B2 * | 11/2009 | Krischker et al. ......... 455/414.1 |
| 8,121,262 | B1 * | 2/2012 | Michaelis .................. 379/88.11 |
| 8,290,525 | B2 * | 10/2012 | Gilson ......................... 455/517 |
| 8,326,285 | B2 * | 12/2012 | Klassen ..................... 455/432.1 |
| 2003/0086547 | A1 * | 5/2003 | Chuang .................... 379/142.06 |
| 2004/0057562 | A1 * | 3/2004 | Myers et al. ............... 379/88.14 |
| 2004/0208301 | A1 * | 10/2004 | Urban et al. ............. 379/142.17 |
| 2005/0047558 | A1 * | 3/2005 | Kogure ...................... 379/88.14 |
| 2005/0243982 | A1 | 11/2005 | Starbuck et al. |
| 2005/0288926 | A1 * | 12/2005 | Benco et al. .................. 704/235 |
| 2006/0093099 | A1 * | 5/2006 | Cho ........................... 379/88.14 |

(Continued)

FOREIGN PATENT DOCUMENTS

DE 102 26 104 A1 12/2003
WO WO 02/17602 A1 2/2002

OTHER PUBLICATIONS

Service Strategies, Inc., Wireless Voice Connector, Nov. 20, 2003.

*Primary Examiner* — Lisa Hashem

(57) ABSTRACT

A method system and apparatus for enhancing digital voice call initiation between a first telephony device and a second telephony device is provided. Text data is associated with digital voice data conveyed between the first telephony device and the second telephony device, the associating occurring prior to initiating transmitting the digital voice data, the text data based on input data received via an input device associated with the first telephony device. The text data is transmitted to the second telephony device in conjunction with transmitting the digital voice data, the text data to be provided synchronously at the second telephony device with an announcement of the digital voice data.

17 Claims, 11 Drawing Sheets

(56) References Cited

U.S. PATENT DOCUMENTS

| | | | |
|---|---|---|---|
| 2006/0146998 A1 | 7/2006 | Mello | |
| 2008/0056283 A1* | 3/2008 | Stephen et al. | 370/401 |
| 2008/0108329 A1* | 5/2008 | Cho et al. | 455/413 |
| 2008/0300873 A1* | 12/2008 | Siminoff | 704/235 |
| 2008/0320101 A1* | 12/2008 | Bennett et al. | 709/217 |
| 2009/0003576 A1* | 1/2009 | Singh et al. | 379/202.01 |
| 2009/0210483 A1* | 8/2009 | Pierce et al. | 709/203 |
| 2010/0029307 A1* | 2/2010 | Hacena et al. | 455/466 |
| 2011/0054647 A1* | 3/2011 | Chipchase et al. | 700/94 |
| 2011/0173001 A1* | 7/2011 | Guy et al. | 704/246 |
| 2011/0177800 A1* | 7/2011 | Gilson | 455/417 |
| 2011/0201363 A1* | 8/2011 | Shim et al. | 455/466 |
| 2011/0319104 A1* | 12/2011 | Williams | 455/466 |
| 2013/0007150 A1* | 1/2013 | Hertz et al. | 709/206 |
| 2013/0012246 A1* | 1/2013 | Gilson | 455/466 |
| 2013/0115930 A1* | 5/2013 | Lee et al. | 455/415 |
| 2013/0157574 A1* | 6/2013 | Craine | 455/41.2 |
| 2013/0268865 A1* | 10/2013 | Rhim et al. | 715/751 |
| 2013/0316746 A1* | 11/2013 | Miller et al. | 455/466 |

* cited by examiner

METHOD, SYSTEM AND APPARATUS FOR ENHANCING DIGITAL VOICE CALL INITIATION BETWEEN A CALLING TELEPHONY DEVICE AND A CALLED TELEPHONY DEVICE

FIELD

The specification relates generally to communication systems, and specifically to a method, system and apparatus for enhancing digital voice call initiation between a calling telephony device and a called telephony device.

BACKGROUND

When a voice connection is established between telephony devices, via a communication network, in general the only information conveyed to the called telephony device about the call is Caller Line Identification (CLID) information (e.g. phone number and/or an identifier of user associated with the calling telephony device). Such information is often not enough to determine whether the call warrants answering, which can lead to wasted bandwidth within the communication network, and inefficient use of resources at both telephony devices in processing voice data conveyed despite the call being generally undesired. Furthermore, if the call is not completed, and voice message data stored, it is often difficult to retrieve a specific saved voice message out of a number of saved messages associated with a particular caller. A similar issue exists with Historical Call Logs (or Call History) provided at telephony device phones. While it is possible to find the date and time of call, as well as information from the CLID, there is no way to distinguish between calls.

BRIEF DESCRIPTIONS OF THE DRAWINGS

Embodiments are described with reference to the following figures, in which.

DETAILED DESCRIPTION OF THE EMBODIMENTS

Figure 1:
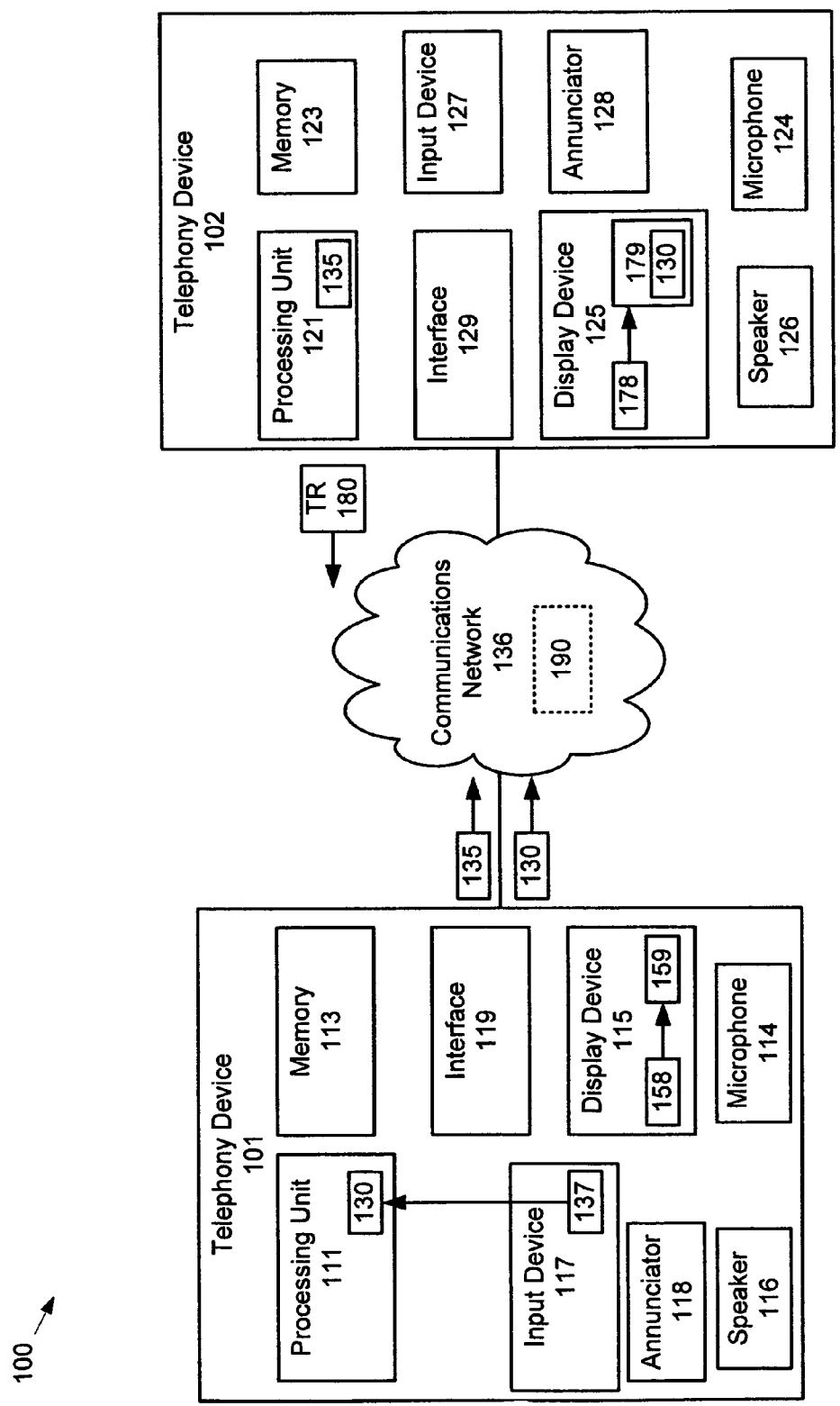
FIG. 1 depicts a system for enhancing digital voice call initiation between a calling telephony device and a called telephony device, according to non-limiting embodiments.

FIG. 1 depicts a system 100 for enhancing voice call initiation between a calling telephony device 101 and a called telephony device 102, according to non-limiting embodiments. Calling telephony device 101 generally comprises a processing unit 111 a memory 113, a microphone 114, a display device 115, speaker 116, an input device 117, an annunciator 118 and a communications interface 119, interconnected with processing unit 111, for example via a computer bus. Similarly, called telephony device 102 generally comprises a processing unit 121 a memory 123, a microphone 124, a display device 125, a speaker 126, an input device 127, an annunciator 128 and a communications interface 129, interconnected with processing unit 121, for example via a computer bus. Calling telephony device 101 is generally enabled to associate text data 130 with digital voice data 135 conveyed between calling telephony device 101 and called telephony device 102, via a communication network 136, the associating occurring prior to initiating transmitting digital voice data 135. Furthermore, text data 130 is generally based on input data 137 received via input device 117. Calling telephony device 101 is further enabled to transmit text data 130 to the called telephony device 102, via communication network 136, in conjunction with transmitting digital voice data 135, text data 135 to be provided synchronously at the called telephony device 102 with an announcement of digital voice data 135, as will be described below.

In some embodiments, each of calling telephony device 101 and called telephony device 102 comprises a telephony device, such as a personal computer, a communications device, a digital telephone, a smart phone, a computing device, PDA, a portable communications device, a portable computing device, a mobile telephone, a cell phone and the like, or a combination thereof.

Processing unit 111 and processing unit 121 can comprise any suitable processor, including but not limited to a central processing unit (CPU).

Memory 113 and memory 123 can each comprise any suitable memory including but not limited to volatile memory, non-volatile memory, read-only memory (ROM), random access memory (RAM), flash memory, removable memory, a hard disk, and the like.

Display device 115 and display device 125 can each comprise any suitable display device, including, but not limited to, any suitable combination of CRT and/or flat panel displays (e.g. LCD, plasma and the like). Display device 115 can comprise circuitry 158 for generating a representation 159 of data. Similarly, display device 125 can comprise circuitry 178 for generating a representation 179 of data. Circuitry 158 and circuitry 178 can each include any suitable combination of circuitry for controlling a CRT and/or flat panel displays etc., including but not limited to display buffers, transistors, electron beam controllers, LCD cells, plasmas cells, phosphors etc. Display device 115 and circuitry 158 can be controlled by processing unit 111 to generate representation 159, and similarly display device 125 and circuitry 178 can be controlled by processing unit 121 to generate representation 179. In particular, processing unit 121 can control display device 125 and circuitry 178 to generate representation 179 including a representation of text data 130, synchronous with controlling annunciator 128 to provide an announcement of digital voice data 135.

Input device 117 and input device 127 can each comprise any suitable input device for accepting input data including but not limited to button(s), a keyboard, a track ball, a scroll wheel and/or a combination. In particular, in some embodiments, the input device 117 enables the receipt of input data 137. In some embodiments, input data 137 comprises text data 130. In other embodiments, input data 137 is received at input device 117 in a T9 format (e.g. input device 117 comprises a keypad) and processing unit 111 is enabled to convert input data 137 into text data 130. Input device 127 can be configured in a manner similar to input device 117 such that input data can be received at input device 127 and converted to text.

Interface 119 and interface 129 can each comprise any suitable combination of wired or wireless interface as desired. In particular, the interface 119 and interface 129 enables communication between calling telephony device 101 and called telephony device 102 via communication network 136. Communication network 136 can be wireless, wired or a combination, as desired. Each of interface 119 and interface 129 is generally compatible with communication network 136. That is, if communication network 136 comprises a wireless network, interface 119 and/or interface 129 are enabled to communicate wirelessly, using any suitable protocol; and/or if communication network 136 comprises a wired network, then and/or interface 129 are enabled to communicate via a wired link, using any suitable wired protocol. In some embodiments, one of interface 119 and interface 129 can be enabled to communicate wirelessly while the other of interface 119 and interface 129 can be enabled for wired communications.

In some embodiments, communication network 136 can comprise at least one network element 190 for managing calls between calling telephony device 101 and called telephony device 102. In particular, network element 190 can comprise a database of telephony devices in communication with communications network 136, and their functionality: for example whether or not a given telephony device, such as called telephony device 102, can process text data 130. Network element 190 can comprise at least one of a switch, a PBX, a VoIP central call controller, and the like.

Annunciator 118 and annunciator 128 can each comprise any suitable annunciator, including but not limited to a speaker, and bell, a buzzer, a synthesizer, a visual annunciator (e.g. a display, a light etc.) and the like, and/or a combination. In some embodiments, annunciator 118 and display device 115, and annunciator 128 and display device 125 can respectively be combined in single respective display/annunciator modules.

Each of microphones 114, 124 and speakers 116, 126 can comprise any suitable combination of microphones and speakers, respectively, to enable receipt and deliver of voice communications at calling telephony device 101 and called telephony device 102. In some embodiments, microphone 114 and speaker 116 can be combined in a handset and/or a headset, which can further include an actuator for indicating that a voice connection is to be completed (i.e. to "pick up the phone"). Similarly, microphone 124 and speaker 126 can be combined in a handset and/or a headset/cradle combination, which can also further include an actuator for indicating that a voice connection is to be completed.

In general, system 100 provides communication between calling telephony device 101 and called telephony device 102 that is a hybrid between text messaging and voice communications, which can generally be referred to as a "text call", in which a phone call associated text message or text data (e.g. text data 130) can be delivered via a digital phone system (e.g. via a packetized protocol such as Voice over Internet Protocol (VoIP), or any other suitable protocol). A text call can also be classified as a text message that is delivered to a phone display (e.g. display device 125) concurrent with an announcement of a phone call at the phone (e.g. telephony device 102). The text message (i.e. text data 130) is displayed on the phone along with the presentation of the call to the phone (e.g. while it is ringing) along with any Caller Line Identification (CLID) information. The text message can be delivered with an outgoing call to the called party's phone (e.g. telephony device 102). Alternatively, a pre-stored text message can be delivered to a caller's phone (e.g. telephony device 102) by the called party's phone (e.g. telephony device 101) on an incoming call to the called party's phone (for example, when telephony device 102 calls telephony device 101, telephony device 101 can cause a text message to be transmitted to telephony device 102; in some of these embodiments, the text message that is transmitted is dependent on identifying information, such as CLID, delivered to telephony device 101 along with the call, e.g. from a specific incoming caller). This comprises a text message in the reverse direction (i.e. from called party to caller) while a call is presented to a called party's phone. This can be useful when a user needs to leave their office but would like to deliver a message to someone and they are expecting that someone to call. When the caller calls, the caller they would see the text message appear on their phone (i.e. telephony device 102) while they hear the far end phone ringing.

In any event, the text message delivered to telephony device 102 can provide topical information to telephony device 102 and the called party's phone can be enabled to respond to the text call in various ways. For example, in response to a text call, the voice call can be completed between the phones, or a text response to the text call can be transmitted from the called phone to the calling phone, as will be described below. A text response can comprise either text data received at the called phone (e.g. called telephony device 102) from an input device (e.g. input device 127), or a pre-configured text data that can be retrieved from a memory (e.g. memory 123) based on input data received from the input device. In any event, the text response can be transmitted back to the calling party's phone (e.g. calling telephony device 101) in response to receiving the text call. An example of such a text response is depicted in FIG. 1, as TR 180.

In general, system 100 provides a number of features that result in reduced bandwidth usage within a communication network and reduced use of resources at calling telephony device 101 and called telephony device 102. Furthermore, the combination of text and voice enables better management of voice communications and more effective text messaging by making it part of a phone call delivered via a digital phone system (e.g. VoIP). For example, in general, a text message (i.e. text data 130) in a text call is provided at a display device of the phone at the same time the call is presented to the phone (i.e. while the phone is ringing). In some embodiments, text message delivery to called telephony device 102 can follow the called telephony device 102 call forwarding/routing rules for digital voice data 135 (i.e. a digital telephone call) including but limited to extending a call nominally destined for a desk phone out to a cellular phone to ensure that it arrives at a telephony device where a called party wants to receive calls. In other embodiments, text messages (e.g. text data 130) can be stored in association with call records within call log and voice mail listings for called telephony device 102.

Figure 2:
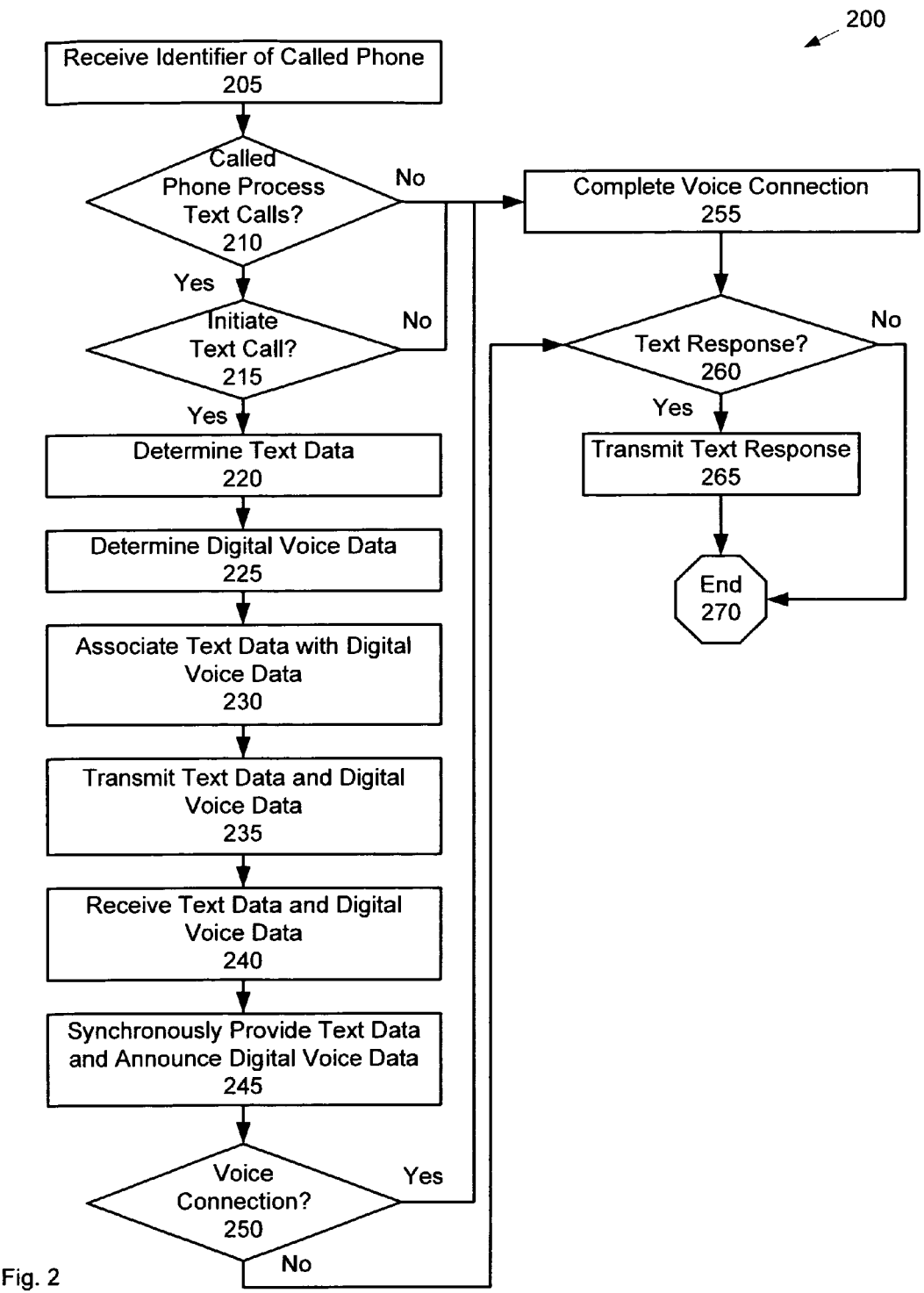
FIG. 2 depicts a method for enhancing digital voice call initiation between a calling telephony device and a called telephony device, according to non-limiting embodiments.

Attention is now directed to FIG. 2 which depicts a method 200 for enhancing digital voice call initiation between a calling telephony device and a called telephony device. In order to assist in the explanation of the method 200, it will be assumed that the method 200 is performed using the system 100. Furthermore, the following discussion of the method 200 will lead to a further understanding of the system 100 and its various components. However, it is to be understood that the system 100 and/or the method 200 can be varied, and need not work exactly as discussed herein in conjunction with each other, and that such variations are within the scope of present embodiments.

At step 205, at calling telephony device 101, an identifier of called telephony device 102 is received, for example via input device 117. Such an identifier can comprise a network address, a telephone number, a MAC address, an IP address, and the like.

At an optional step 210, it can be determined whether called telephony device 102 can process text calls and/or process text data 130. For example, network element 190 can be queried by calling telephony device 101 as to the functionality of called telephony device 102, and specifically whether called telephony device 102 can process text calls and/or text data 130. Network element 190 can return a positive or negative response to the query. If the response is negative, a standard voice connection can be completed at step 255.

Figure 3:
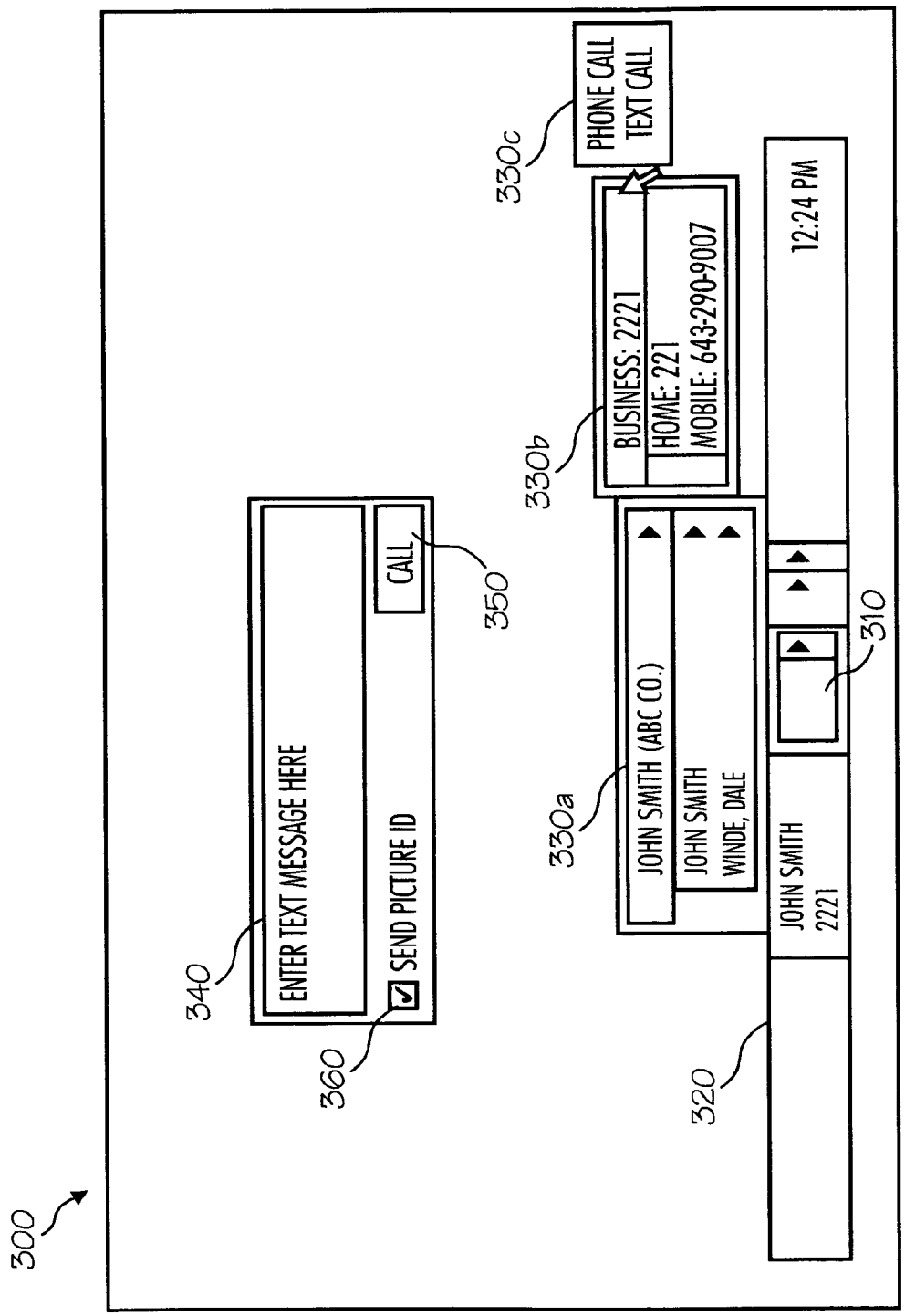
FIG. 3 depicts a representation of a display device, including an application for enhancing digital voice call initiation between a calling telephony device and a called telephony device, according to non-limiting embodiments.

However, if the response is positive, at step 215, processing unit 111 can control display device 115 to provide a representation (e.g. within representation 159) indicative that a text call can be made to called telephony device 102 and a determination made as to whether a text call is to be initiated. For example, input device 117 can receive input data indicative that a text call is to be made. A non-limiting example is provided in FIG. 3, described below. If a text call is not to be made, a standard voice connection can be completed at step 255, otherwise at step 220 text data 130 is determined, text data 130 based on input data 137 received via input device 117. In some embodiments, input data 137 comprises text data 130, text data 130 entered via a keyboard or keypad (e.g. via the T9 protocol). In other embodiments, input data comprises data for retrieving text data 130 from memory 113; in these embodiments, memory 113 can store a set of pre-configured text data, text data 130 chosen from the set. For example, once it is determined that a text call is to be initiated, processing unit 111 can retrieve the set and control display device 115 to provide a representation (e.g. within representation 159) of the set, such that one of the set of pre-configured text data can be designated as text data 130 (e.g. text data 130 can be selected via input device 117 from a menu provided at display device 115).

At step 225 digital voice data 135 is determined and/or assembled. For example, digital voice data 135 can comprise data for initiating a voice call to called telephony device 102, such as the identifier received at step 205 and any other data that can be processed within communication network 136 to connect the call, including but not limited to network element 190. Step 225 can occur concurrently with any of steps 205-215. Furthermore, it is understood that once a voice call is initiated, digital voice data 135 can further comprise voice data received from microphone 114. It is further understood that digital voice data 135 can be packetized for transmission to called telephony device 102, each packet routed to called telephony device 102 via communications network 136. It is yet further understood that digital voice data 135 can initially be transmitted along a control path in communications network 136, and once a voice connection is completed, transmitted along a media/voice path, as will be described below with reference to FIGS. 6 to 9.

At step 230, text data 130 is associated with digital voice data 135, the associating occurring prior to initiating transmission of digital voice data 135. In some embodiments, text data 130 is incorporated into digital voice data 135, for example in a field designated for text data 130. In other embodiments, digital voice data 135 is updated with an identifier of text data 130 and/or an indication that text data 130 is associated with digital voice data 135.

At step 235, text data 130 is transmitted to called telephony device 102 in conjunction with transmitting digital voice data 135, text data 130 to be provided synchronously at called telephony device 102 with an announcement of digital voice data 135, as in step 245.

Furthermore, it is understood that text data 130 and digital voice data can be transmitted via the same or different paths within communication network 136. For example, voice data 135 can be transmitted via a voice path and text data 130 can be transmitted via a text path.

At step 240, text data 130 and digital voice data 135 are received at called telephony device 102. It is understood that text data 130 and digital voice data 135 can be received at approximately the same time (e.g. if digital voice data 135 comprises text data 130), or at different times. It is furthermore understood that one of text data 130 and digital voice data 135 can be received before the other of digital voice data 135 and text data 130, for example in embodiments where text data 130 and digital voice data 135 are transmitted via different paths within communication network 136.

At step 245, display device 125 and annunciator 128 are synchronously controlled by processing unit 121 to provide, respectively, a representation of text data 130 and to announce reception of digital voice data 135. In embodiments where one of text data 130 and digital voice data 135 are received before the other of digital voice data 135 and text data 130, called telephony device 102 can enter a waiting mode until the other of digital voice data 135 and text data 130 is received. Hence, in general, a voice call is announced (e.g. annunciator 128 "rings") and text data 130 is synchronously provided at display device 125 to convey, for example, a purpose of the voice call.

In some embodiments, telephony device 102 can be enabled for text to speech conversion and at step 245 "reads" text data 130 in place of ringing (e.g. telephony device 102 could "ring" once and then text data 130 could be played via annunciator 128 and/or through speaker 126).

At step 250, a determination can be made as to whether or not a voice connection is to be completed. For example, input data can be received indicative that the voice connection is to be completed, including but not limited to receiving input data from at least one of input device 127 and an actuator (e.g. via a handset and/or headset/cradle combination). If so, then the voice connection is completed at step 255.

At step 260, a determination can be made as to whether or not a text response to the text call is to be transmitted. Such a determination can be made whether or not the voice connection is completed at step 255. In any event, if so, text response 180 is determined and transmitted at step 265. Text response 180 can be determined in a manner similar to the determination of text data 130 at step 220, and based on input data received at input device 127. In some embodiments, the input data received at input device 127 can comprise the text response 180, while in other embodiments, the input data received at input device 127 can enable the selection of one of a pre-configured set of text response stored in memory 123. It is understood that text response 180 is subsequently received at calling telephony device 101 and display device 115 can be controlled to provide a representation of text response 180 (e.g. within representation 159). It is furthermore understood that further text data can be determined and transmitted to called telephony device 102, in response to receipt of text response 180. Furthermore, it is understood that an exchange of text data and text responses between calling telephony device 101 and called telephony device 102 can continue indefinitely, in the manner of instant messaging.

In some embodiments, after step 235, a determination can be made at calling telephony device 101 as to whether text data 130 was delivered and/or provided at called telephony device 102. For example, in some embodiments, step 210 does not occur and hence there is possibility that text data 130 cannot be provided at called telephony device 102. In these embodiments, called telephony device 102 can respond with an error when text data 130 is received. Alternatively, delivery of text data 130 can fail. In any of these embodiments, network element 190 can monitor delivery of text data 130 and transmit an indication that text data 130 was not delivered and/or that delivery of text data 130 failed in general. Hence, calling telephony device 101 receives an indication that text data 130 was at least one of not delivered and not provided at called telephony device 102. In response, processing unit 111 can control display device 115 to provide a representation of the indication, for example, within representation 159.

In some embodiments, steps 230, 235, 240 and 245 can be completed via respective voice communication applications and respective instant message messaging applications at each of calling telephony device 101 and called telephony device 102. For example, each of calling telephony device 101 and called telephony device 102 can comprise a respective voice communication application and a respective instant message messaging application, each respective instant messaging application under control by the respective voice communication application, in a slave mode. Hence, once text data 130 is received, text data 130 is exchanged between the respective instant message messaging applications via communications network 136.

In some embodiments, method 200 can further comprise storing text data 130 in association with CLID data and/or digital voice data 135 and/or a voice message in a call history storage device and/or a voicemail system. In some embodiments, text data 130 can be used as the subject line in a Unified Messaging application (e.g. i.e. a voicemail system that forwards voicemails to an email account as an email attachment; in some of these embodiments text data 130 can be truncated with a remainder of text data 130 located in the body of the e-mail; alternatively, text data 130 could also be included in the body of an email where the full text can be displayed). In some embodiments, network element 190 comprises a voicemail system and/or a call history storage device, while in other embodiments called telephony device 102 comprises a voicemail system and/or a call history storage device. However, when text data 130 is stored centrally at network element 190, system 100 is enabled to provide text data 130 and associated with CLID data and/or digital voice data 135 and/or a voice message to different devices connected to network element 190, for example in hot desking scenarios. In some of these embodiments, method 200 can further comprise purging stored data according to pre-configured rules (e.g. when memory usage reaches a threshold level) in order to manage the storage requirements.

Various architectures and embodiments will now be described for: 1) text entry for a text call on various types of devices; 2) delivery and routing of text data in text calls; and 3) display and storage of text calls/text data on various types of devices.

1. Text Entry for Text Calls

How text data is received for a text call can be dependant on the device being used to initiate the call. The following describes how a text call would be initiated on various devices.

Initiating Personal Computer/Smart Phone Text Calls

There are two common types of Personal Computer (PC) applications that can be used to initiate phone calls: softphone application calls and desk phone companion application calls. A softphone operates independently of any physical desk phone and can use the PC's speakers and microphone (or attached headset) for the phone call audio. A desk phone companion generally works in conjunction with a physical desk phone by causing the audio for a PC application initiated call to go through the desk phone. Each of these two PC Application types can be extended to offer an option of initiating a text call via the following steps, described with reference to FIG. 3, which depicts a representation 300 of desktop of a display device of a PC, similar to display device 115, according to non-limiting embodiments:

Receive input data identifying a phone number (e.g. for a contact). For example, a desk phone companion or soft phone client application can be selected via an icon 310 on a toolbar 320, and a contact/phone number selected via menus 330a, 330b, for example using input data received via a pointing device.

Receive input data indicative that a text call is to be initiated rather than just a phone call/voice call. For example, a text call option can be selected from a menu/pop-up box 330c, for example using input data received via a pointing device, once a phone number to dial has been identified.

When a text call is selected in menu/pop-up box 330c, a text entry box 340 can be provided; text data can then be received via text entry box 340. In some embodiments, text can be cut and paste (and/or dragged and dropped) text from another application. For example, the subject line from an email, document title, etc. can be cut and paste, indicative that a subject of the text call. Hence, an e-mail with a given subject line can be responded to via a text call using the same subject line.

Once the text data has been received, a "Call" button 350 within representation 300 can be actuated, again using a pointing device and the text call can be initiated either directly via the PC for a softphone application or via an associated desk phone for a desk phone companion application.

In some embodiments, a text call can be initiated by receiving input data indicative that a phone number within an email, webpage or document has been highlighted, and receiving further input data indicative that a right-click has occurred on the highlighted text. In response, a menu, similar to menu/pop-up box 330c, can be provided providing an option to place a text call to the highlighted number, resulting in a text entry box and call button being provided, as described above.

Once text data is received, the text data can be transmitted with digital voice data to a called phone (e.g. the phone number can be "dialled" in the standard manner offered by the application, before, after or synchronous with transmission of the text data) via, for example, a LAN (local area network) connection using the particular VoIP protocol that the softphone or desk phone companion was developed to use (including but not limited to standard and proprietary VoIP protocols, proprietary VoIP protocols specific to a VoIP PBX vendor's product). In some embodiments, existing protocols can be extended to facilitate transmission of text data along with the phone call.

A smart phone initiated text call can proceed in manner similar to the above described PC application initiated text call. The smart phone can comprise a VoIP client that enables communication with a VoIP phone system. The functionality of such a VoIP client can be extended in much the same way as with the PC based application to allow entry of text for a text call.

In some embodiments of a PC or smart phone initiated text call, picture data (e.g. picture ID) can be transmitted along with the text data, as can be indicated via a check box 360 in text entry box 340. In some embodiments picture data can then be selected (e.g. a JPEG, GIF, TIFF file, and the like) via a menu (not depicted), while in other embodiments, picture data can be pre-selected such that a check in check box 360 is indicative that the pre-selected picture data is to be transmitted along with text data. In some embodiments, the pre-selected picture data can be used as a picture ID for all text calls originating from the PC or smartphone. Indeed, the pre-selected picture data can be transmitted or not on a call by call basis. The picture data can then be displayed on the called party's phone along with the text data. In some embodiments, the picture data is not subsequently stored on the called party's phone along with the text message (i.e. within their call log or voicemail listings).

Desk Phone Initiated Text Calls

Figure 4:
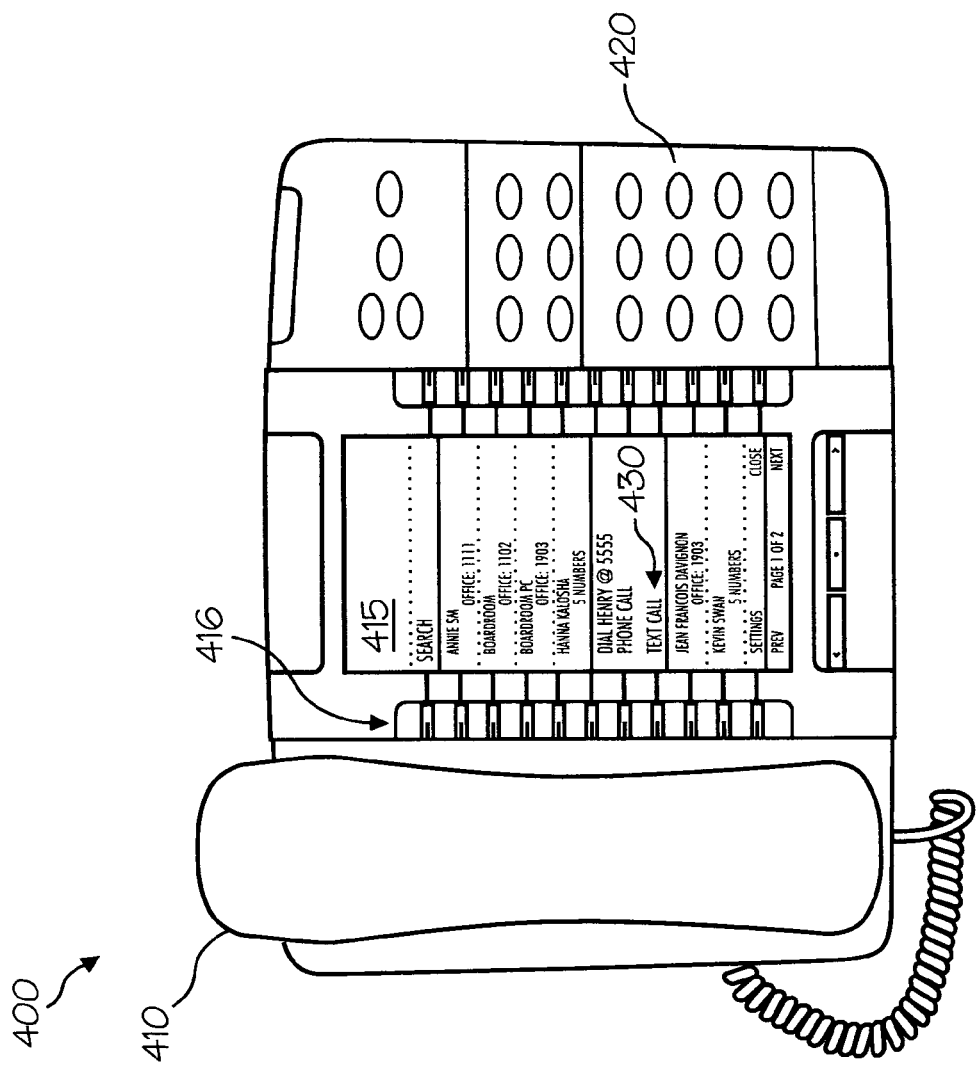
FIGS. 4 and 5 depict telephony devices, according to non-limiting embodiments.

A text call can be initiated via desk phone 400, as depicted in FIG. 4, according to non-limiting embodiments. Desk phone 400 comprises a handset 410, a display device 415, a plurality of buttons 416, and a keypad 420. In some embodiments, calling desk phone 400 is similar to telephony device 101, with handset 410 analogous to microphone 114 and speaker 116, a display device 415 analogous to display device 115, and plurality of buttons 416 and keypad 420 analogous to input device 117. While not depicted, it is understood that desk phone 400 further comprises a processing unit similar to processing unit 111, a memory similar to memory 113 and a communication interface similar to communication interface 119. It is further understood that representations of data, such as menu items, provided at display device 115 can be selected via receipt of input data indicating that a button 416 adjacent to menu item has been actuated. A text call can be initiated via the following steps, according to non-limiting embodiments:

Receive input data identifying a phone number (e.g. for a contact) to dial and/or input data identifying a speed dial number at desk phone 400 in any suitable manner (e.g. receive a phone number via keypad 420, receive input data indicative that a button 416 adjacent a speed dial number provided at display device 415 has been actuated).

Receive input data indicative that a text call is to be initiated rather than just a phone call/voice call. For example, a text call option 430 can be selected from a menu provided at display device 415, for example using input data received via an adjacent button 416.

Figure 5:
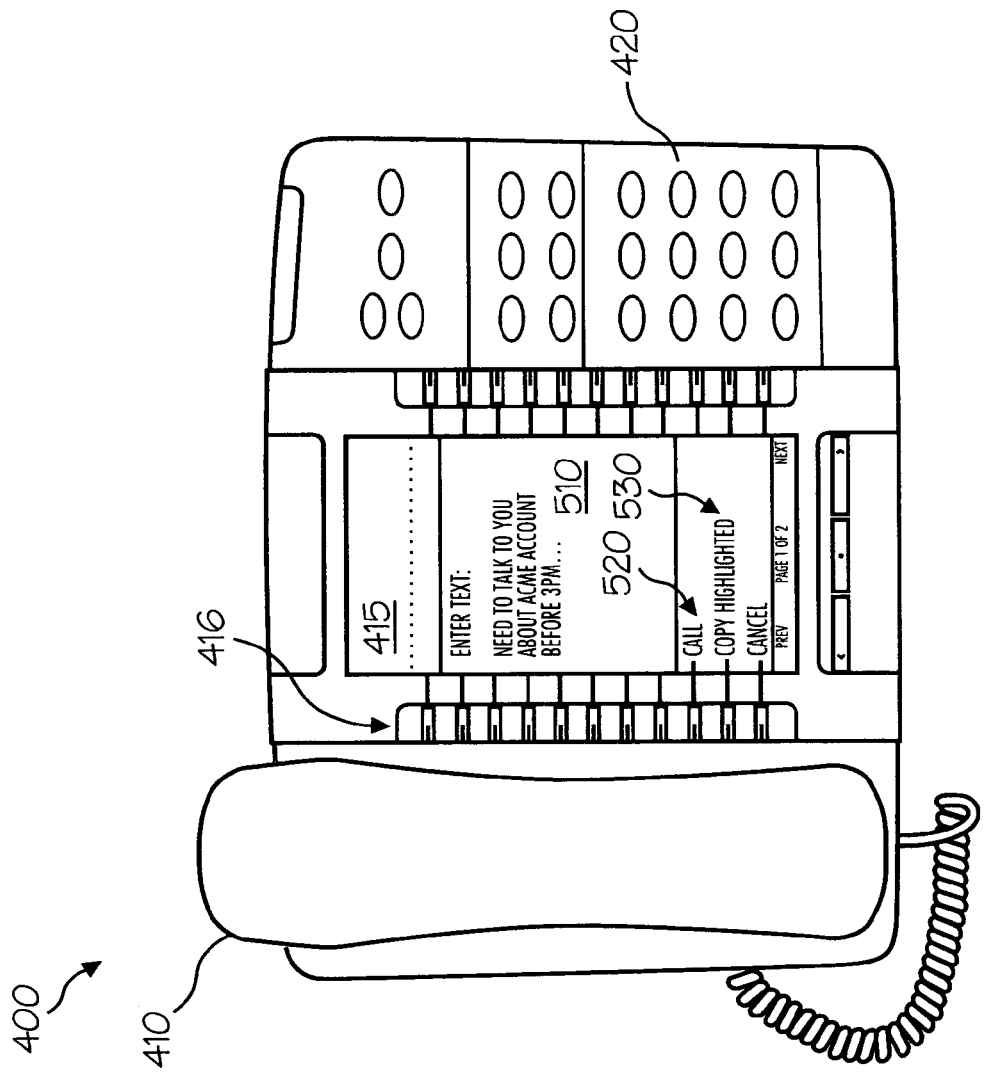

Directing attention now to FIG. 5, similar to FIG. 4 with like elements having like numbers, display device 415 has been controlled to provide a representation of a text entry window 510, where text data can be received via the keypad 420, using any text entry protocol, including but not limited to T9 would be provided. Completion of receipt of text data can be determined via input data received via an button 416 adjacent a "Call" soft key 520, which can also initiate the text call.

In some embodiments, desk phone 400 is connected to a PC (not depicted) running a desk phone companion application, desk phone 400 can comprise a "Copy Highlighted" soft key 530 which, if actuated, causes text highlighted in application at the PC (i.e. web page content, email content, document title, etc.) to be copied to desk phone 400. Additional text data can be received via keypad 420 and the text call can be initiated via "Call" soft key 520.

2. Delivery and Routing of Text Data in a Text Call

Generally, text data can be attached to the voice call portion of a text call and can follow the same path through a communication network taken by the packetized voice data for that phone call much in the same way CLID information can be transmitted to a called device.

Device Capability Identification

In some embodiments, the central call control capability is resident in a VoIP Controller that sets up the call routing (e.g. as depicted in FIGS. 6 to 9, described below), the VoIP controller having access to data of whether a called party's phone is capable of receiving a text call or not. This data enables an endpoint to transmit data to the calling party's phone indicative of whether the called party's phone is able to process text calls or not, prior to text data being received at the calling party's phone, which generally prevents the text data from being entered/received, saving resources at the calling party's phone. In embodiments where this data is accessible to the VoIP Controller, it can be processed in conjunction with data indicative of what physical phone the called party is logged into or forwarded to. When input data indicative that a text call is to be initiated is received at the calling party's phone, the phone number is received, the calling party's phone can initiate a communication with the central call control capability at the VoIP controller to inquire if the called party's phone (e.g. the phone where data for the called party is currently routed to) is capable of accepting text calls. If it is, then a text entry window will be displayed as described above. If it isn't, a message will be displayed at the calling party's phone indicating that the called party is not able to receive text calls at this time and the call will be placed without presenting the text entry window. Alternatively, an option can be presented whereby a text message can be conveyed to a device associated with the called party via an Instant Messaging (IM) or e-mail client. If selected, text data can be received and transmitted with or without placing a phone call.

In any event, once the text call is initiated, in some embodiments, the called party whose phone was capable of receiving a text call at the time the text call option was selected, will no longer be able to receive a text call at a current phone: for example, the called party can forward their calls to a new phone during the time interval between when the text call option is selected and the time the text call is initiated. In these embodiments, the calling party's phone can provide an error message indicating that the text data was not delivered.

In some embodiments, routing of text data (and/or digital voice data) and/or completing a voice connection and/or controlling an annunciator to announce the arrival of digital voice data, can be determined based on the content of the text data. For example, when text data is routed through a central call controller (e.g. network element 190 and/or central call controllers described below with reference to FIGS. 6 to 9), the text data can be processed to determine if text data comprises keywords, such as an account number, a password, or any other suitable keywords. Suitable routing of text data (and/or digital voice data) and/or completing a voice connection and/or controlling an annunciator to announce the arrival of digital voice data can then be determined based on the keywords. For example, a salesperson who wishes to be contacted concerning only certain accounts can instruct his customers to include their account numbers in text data; their calls can then be routed accordingly. Similarly, an executive who wishes to be contacted only by given individuals can provide the individuals with a password; the password can be entered as text data into a calling telephony device, and a text call from the calling telephony device routed accordingly (e.g. forwarded to a cell phone of the executive and/or causing a processing unit at a called telephony device to control an annunciator announcing the text call). In general, it is understood that, in these embodiments, method 200 further comprises the steps of: determining if text data comprises a given keyword; and at least one of routing text data (and/or digital voice data), completing a voice connection, and controlling an annunciator to announce the arrival of digital voice data based on the given keyword. It is further understood that a copy of the given keyword (or given keywords) are stored at network element 190 and/or called telephony device 102.

Call Set-Up for a Text Call

Call set-up for a text call will now be described for various call scenarios.

Desk Phone Initiated Text Call

Figure 6:
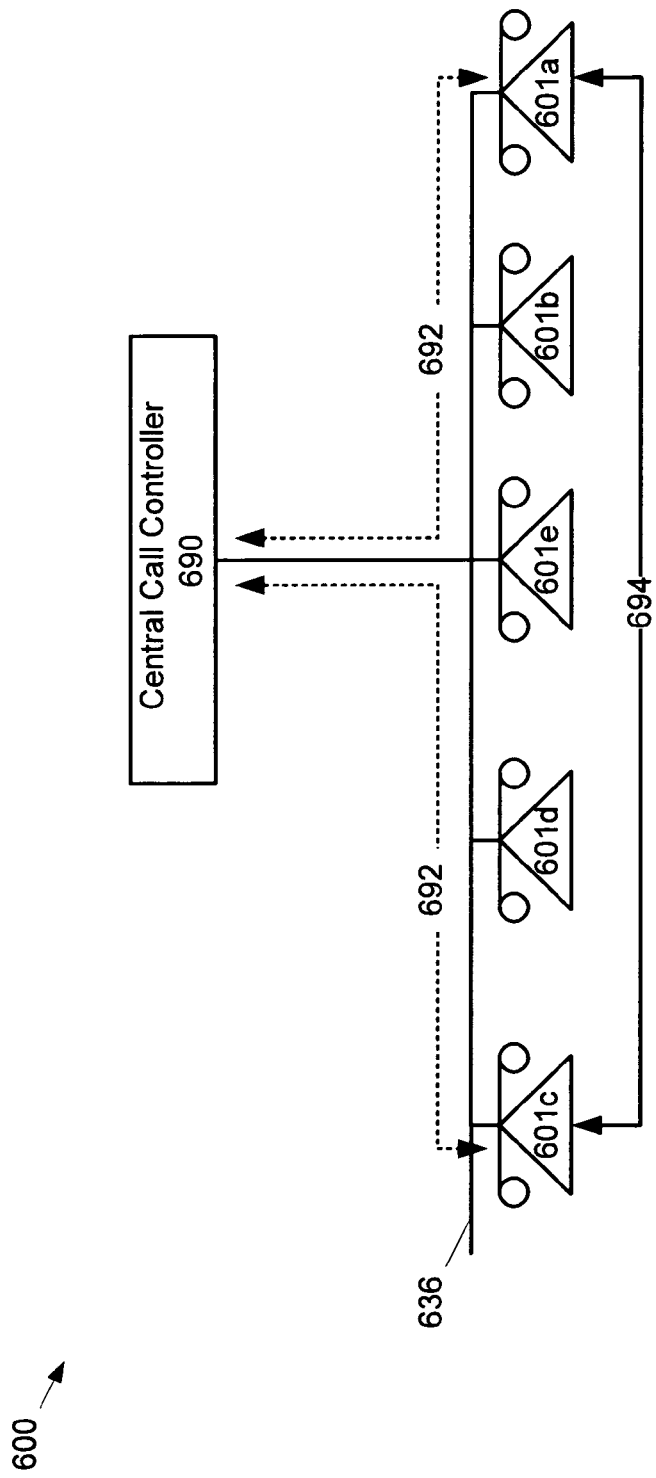
FIGS. 6 to 9 depict systems for enhancing digital voice call initiation between a calling telephony device and a called telephony device, according to non-limiting embodiments.

Attention is directed to FIG. 6, which depicts a system 600 for enhancing digital voice call initiation between a calling telephony device and a called telephony device, according to non-limiting embodiments. System 600 comprises a plurality of telephony devices 601*a*, 601*b* . . . 601*e* (generically a telephony device 601 and collectively a telephony device 601) in communication via a communication network 636, for example, a LAN and/or a corporate LAN, communication between telephony devices 601 controlled via a central call controller 690, including but not limited to a VoIP call controller. Each telephony device 601 can be similar to at least one of calling telephony device 101, called telephony device 102 and phone 400. In particular non-limiting embodiments, each telephony device 601 comprises a corporate VoIP desk phone. Central call controller 690 can be similar to network element 190. In non-limiting exemplary embodiments, described below, a text call is initiated at telephony device 601*a* to telephony device 601*c*. The following steps occur:

i). At telephony device 601*a*, the phone number for telephony device 601*c* can be determined via a phone book function.

ii). Telephony device 601*a* provides an option to initiate a text call.

iii). Telephony device 601*a* receives an indication that a text call is to be initiated. A query is made to central call controller 690 to determine if telephony device 601*c* is able to process text calls. If it isn't, a message is displayed on telephony device 601*a* indicating that telephony device 601*c* is unable to process text calls. Telephony device 601*a* then provides an option of placing a regular phone call or alternatively entering a text message to send, without a phone call, via an instant messaging (IM) or e-mail client, for example to an IM or e-mail address associated with telephony device 601*c* and/or a user of telephony device 601*c*.

iv). If telephony device 601*c* is able to process text calls, telephony device 601*a* presents a text entry area, similar to text entry box 510, where text data can be received using, for example, a keypad at telephony device 601*a*. Once receipt of text data is completed, the text call is initiated at telephony device 601*a* by transmitting text data and digital voice data to central call controller 690.

v). The text call is set up by central call controller 690 and a control path 692 is established from between telephony devices 601*a* and 601*c*, via central call controller 690. Central call controller 690 controls telephony devices 601*a* and 601*c* via control path 690 such that a media/voice path 694 is set up directly between them. The text data is transmitted via control path 694 through the central call controller 690 and is presented to telephony device 601*c*. This enables central call controller 690 to store the text data for call history tracking purposes. It also enables the text data to be sent to two different endpoints if a user's call routing settings set up within the central call controller 690 have incoming calls presented to two different devices at the same time (e.g. telephony device 601*c* and a cell phone). The protocol used to set-up the call can be generally enabled to permit transmission of the text data from telephony device 601*a* to telephony device 601*c* in a manner to that used for CLID data.

vi). When the text data arrives at telephony device 601*c*, and the media/voice path 694 is established, an annunciator at telephony device 601*c* announces the call (i.e. telephony device 601*c* begins ringing) and provides the CLID data plus the text data.

vii). In some embodiments, along with the text data provided at telephony device 601*c*, telephony device 601*c* can provide pre-configured text responses (e.g. "I will call you back") that can be selected and transmitted back to telephony device 601*a*; the text response is then provided at telephony device 601*a*.

Desk Phone Companion Application Initiated Text Call

Figure 7:
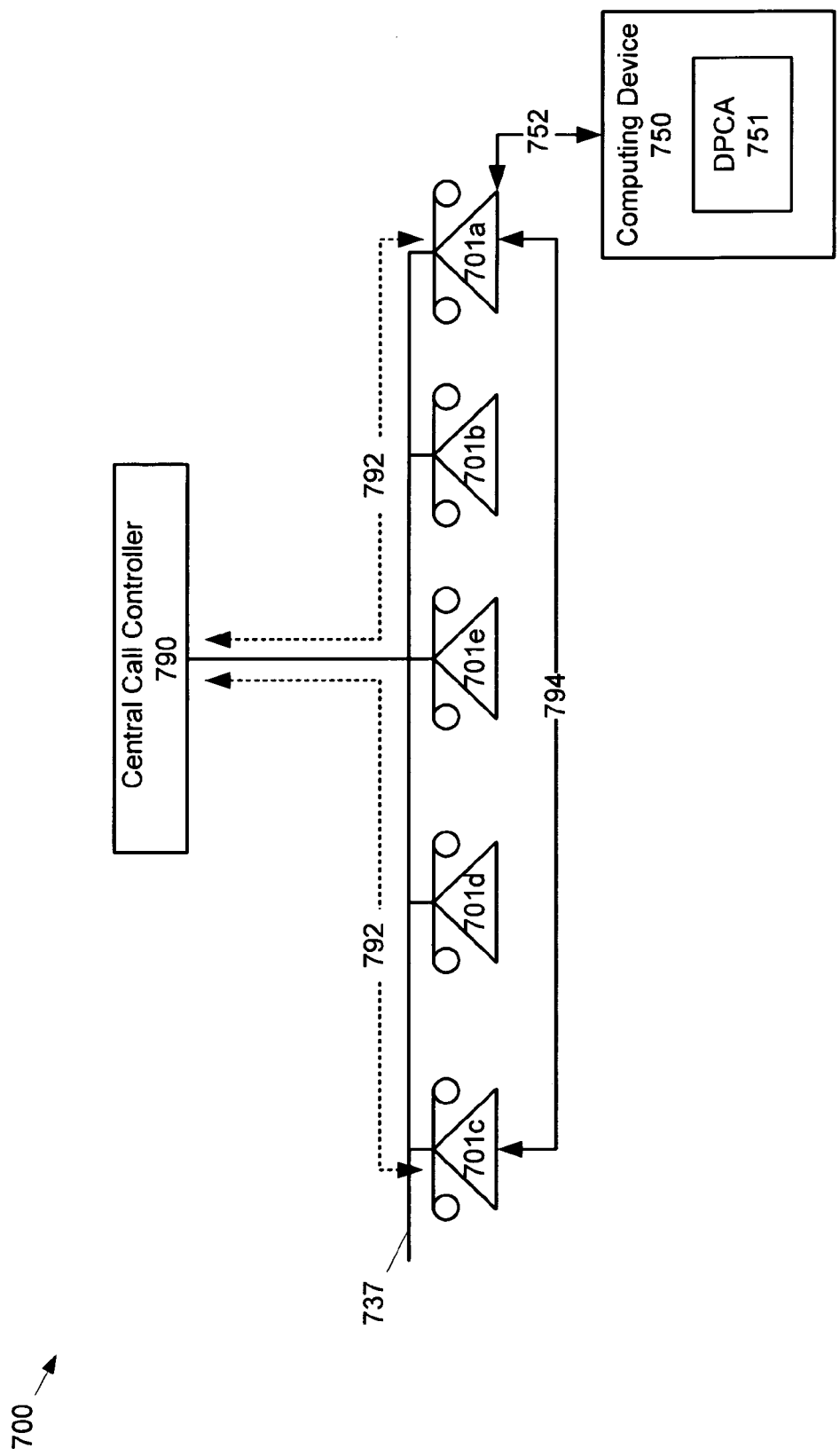

Attention is directed to FIG. 7, which depicts a system 700 for enhancing digital voice call initiation between a calling telephony device and a called telephony device, according to non-limiting embodiments. System 700 comprises a plurality of telephony devices 701*a*, 701*b* . . . 701*e* (generically a telephony device 701 and collectively a telephony device 701) in communication via a communication network 737, for example, a LAN and/or a corporate LAN. Telephony device 701*a* is paired with a computing device 750 which can control telephony device 701*a* via desk phone companion application 751 and a link 752. Communication between telephony devices 701 controlled via a central call controller 790, including but not limited to a VoIP call controller. Each telephony device 701 can be similar to at least one of calling telephony device 101, called telephony device 102 and phone 400. In particular non-limiting embodiments, each telephony device 701 comprises a corporate VoIP desk phone. Computing device 750 can include, but is not limited to a personal computer. Link 752 can be wired or wireless as desired. Central call controller 790 can be similar to network element 190. In non-limiting exemplary embodiments, described below, a text call is initiated at computing device 750, via desk phone companion application 751, to telephony device 701*c*. The following steps occur:

i). At computing device 750, the phone number for telephony device 701*c* can be determined via a phone book function within desk phone companion application 751.

ii). Computing device 750, via desk phone companion application 751, provides an option to initiate a text call.

iii). Computing device 750, via desk phone companion application 751, receives an indication that a text call is to be initiated. A query is made to central call controller 790, via link 752 and telephony device 701*a*, to determine if telephony device 701*c* is able to process text calls. If it isn't, a message is displayed at computing device 750 indicating that telephony device 701*c* is unable to process text calls. Computing device 750, via desk phone companion application 751, then provides an option of placing a regular phone call or alternatively entering a text message to send, without a phone call, via an instant messaging (IM) or e-mail client, for example to an IM or e-mail address associated with telephony device 701*c* and/or a user of telephony device 701*c*.

iv). If telephony device 701*c* is able to process text calls, computing device 750, via desk phone companion application 751, presents a text entry area, similar to text entry box 510, where text data can be received using, for example, a keyboard at computing device 750. Once receipt of text data is completed, the text call is initiated at telephony device 701*a* by transmitting text data and digital voice data to central call controller 790.

v). The text call is set up by central call controller 790 and a control path 792 is established from between telephony devices 701a and 701c, via central call controller 790. Central call controller 790 controls telephony devices 701a and 701c via control path 790 such that a media/voice path 794 is set up directly between them. The text message data is transmitted via an API (application programming interface) from computing device 750 to telephony device 701a (e.g. via Computer Supported Telecommunications Application (CSTA) protocol) and then from telephony device 701a, via control path 794, through the central call controller 790 and is presented to telephony device 701c. This enables central call controller 790 to store the text data for call history tracking purposes. It also enables the text data to be sent to two different endpoints if a user's call routing settings set up within the central call controller 790 have incoming calls presented to two different devices at the same time (e.g. telephony device 701c and a cell phone). The protocol used to set-up the call can be generally enabled to permit transmission of the text data from telephony device 701a to telephony device 701c in a manner to that used for CLID data.

vi). When the text data arrives at telephony device 701c, an annunciator at telephony device 701c announces the call (i.e. telephony device 701c begins ringing) and provides the CLID data plus the text data. In some embodiments, media/voice path 794 is established after the call is answered. In other embodiments, if the call is not answered, then call controller 790 can set up a voice path to a centralized voicemail server (not depicted).

vii). In some embodiments, along with the text data provided at telephony device 701c, telephony device 701c can provide pre-configured text responses (e.g. "I will call you back") that can be selected and transmitted back to telephony device 701a; the text response is then provided at telephony device 701a.

Soft Phone Application Initiated Text Call

Figure 8:
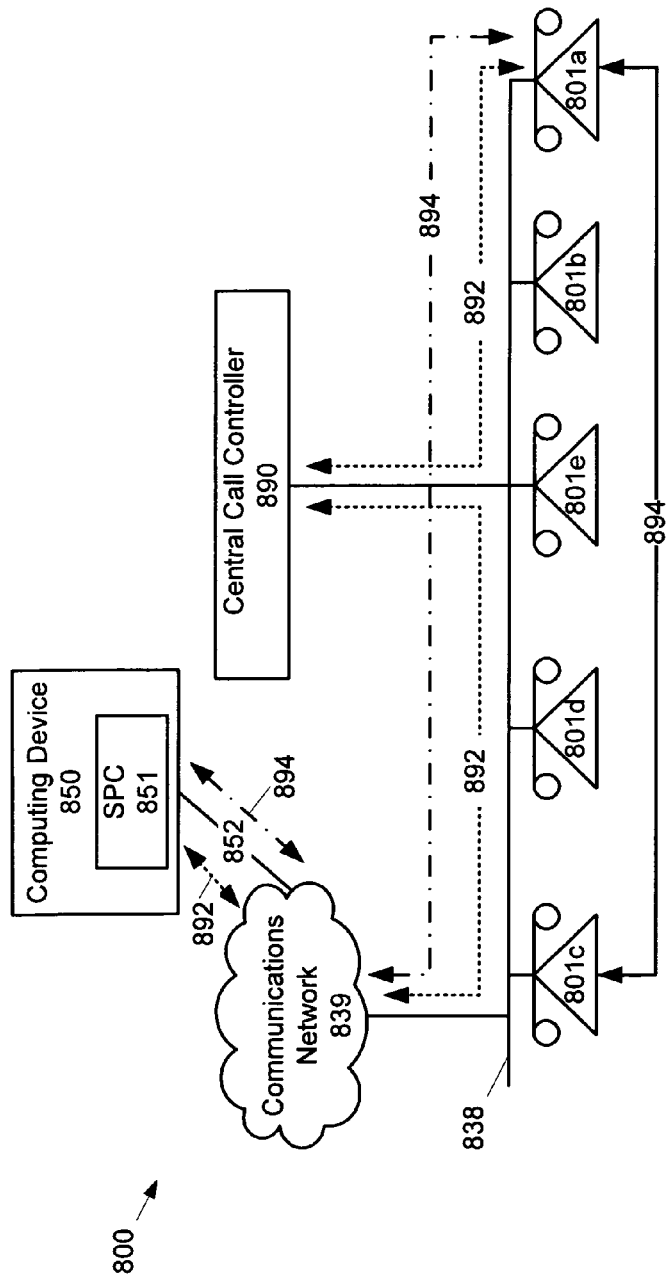

Attention is directed to FIG. 8, which depicts a system 800 for enhancing digital voice call initiation between a calling telephony device and a called telephony device, according to non-limiting embodiments. System 800 comprises a plurality of telephony devices 801a, 801b . . . 801e (generically a telephony device 801 and collectively a telephony device 801) in communication via a communication network 838, for example, a LAN and/or a corporate LAN. Communication network 838 is connected to a communication network 839. A computing device 850, which comprises a soft phone client 851, is in communication with communication network 839 via a link 852. Communication between telephony devices 801 and computing device 850 can be facilitated via a central call controller 890, which can include, but is not limited to, a VoIP call controller. Each telephony device 801 can be similar to at least one of calling telephony device 101, called telephony device 102 and phone 400. In particular non-limiting embodiments, each telephony device 801 comprises a corporate VoIP desk phone. Computing device 850 can include, but is not limited to a personal computer, and can be associated with a mobile worker. Link 852 can be wired or wireless as desired. Central call controller 890 can be similar to network element 190. In non-limiting exemplary embodiments, described below, a text call is initiated at computing device 850, via softphone client 852, to telephony device 801a. The following steps occur:

i). At computing device 850, the phone number for telephony device 801c can be determined via a phone book function within softphone client 851.

ii). Computing device 850, via softphone client 851, provides an option to initiate a text call.

iii). Computing device 850, via softphone client 851, receives an indication that a text call is to be initiated. A query is made to central call controller 890, via link 852, and communications networks 839 and 838, to determine if telephony device 801a is able to process text calls. If it isn't, a message is displayed at Computing device 850 indicating that telephony device 801a is unable to process text calls. Computing device 850, via softphone client 851, then provides an option of placing a regular phone call or alternatively entering a text message to send, without a phone call, via an instant messaging (IM) or e-mail client, for example to an IM or e-mail address associated with telephony device 801a and/or a user of telephony device 801a.

iv). If telephony device 801a is able to process text calls, computing device 850, via softphone client 851, presents a text entry area, similar to text entry box 510, where text data can be received using, for example, a keyboard at computing device 850. Once receipt of text data is completed, the text call is initiated at computing device 850, via softphone client 851, by transmitting text data and digital voice data to central call controller 890.

v). The text call is set up by central call controller 890 and a control path 892 is established between computing device 850 and telephony device 801a, via central call controller 890. Central call controller 890 controls telephony device 801a via control path 890 such that a media/voice path 894 is set up directly between computing device 850 and telephony device 801a. The text message data is transmitted via control path 894 from computing device 850 to telephony device 801a, through the central call controller 890. This enables central call controller 890 to store the text data for call history tracking purposes. It also enables the text data to be sent to two different endpoints if a user's call routing settings set up within the central call controller 890 have incoming calls presented to two different devices at the same time (e.g. telephony device 801a and a cell phone). The protocol used to set-up the call can be generally enabled to permit transmission of the text data from computing device 850 to telephony device 801a in a manner to that used for CLID data.

vi). When the text data arrives at telephony device 801a, an annunciator at telephony device 801a announces the call (i.e. telephony device 801a begins ringing) and provides the CLID data plus the text data. In some embodiments, media/voice path 894 is established after the call is answered. In other embodiments, if the call is not answered, then call controller 890 can set up a voice path to a centralized voicemail server (not depicted).

vii). In some embodiments, along with the text data provided at telephony device 801a, telephony device 801a can provide pre-configured text responses (e.g. "I will call you back") that can be selected and transmitted back to computing device 850; the text response is then provided at computing device 850.

Smart Phone Initiated Text Call

Figure 9:
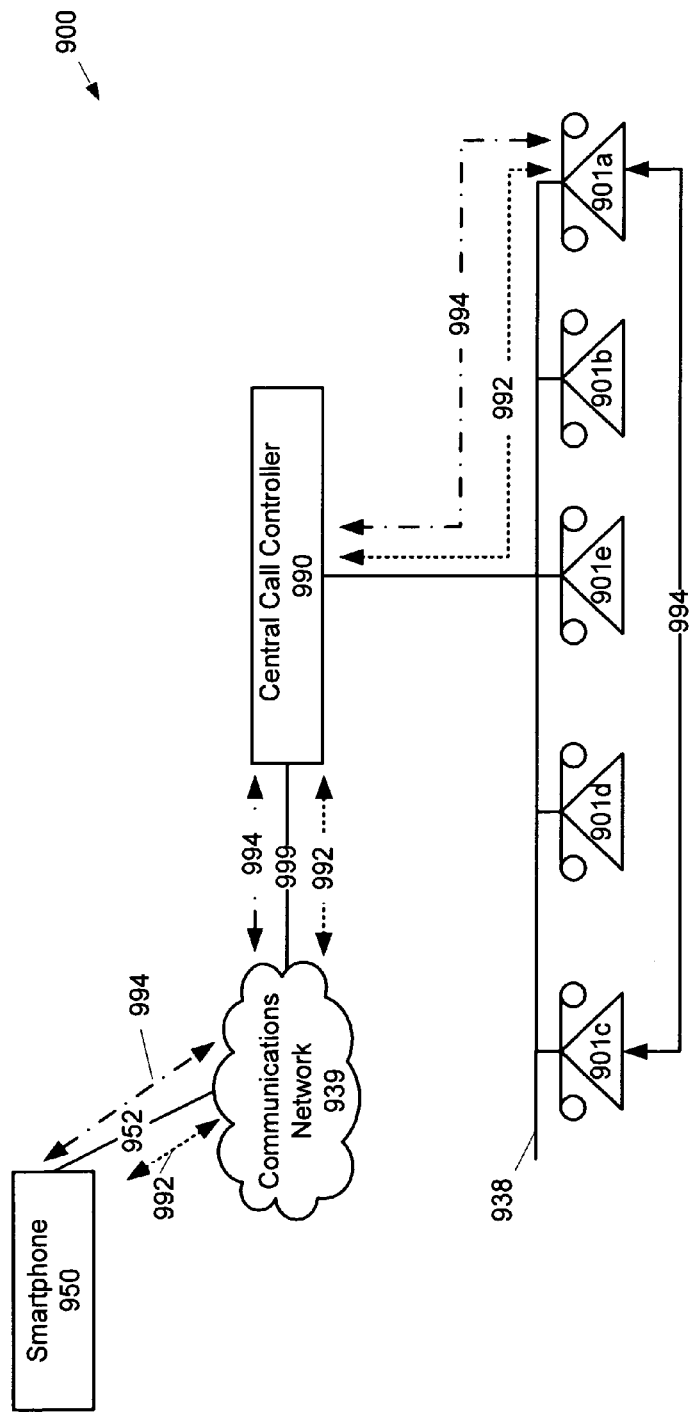

Attention is directed to FIG. 9, which depicts a system 900 for enhancing digital voice call initiation between a calling telephony device and a called telephony device, according to non-limiting embodiments. System 900 comprises a plurality of telephony devices 901a, 901b . . . 901e (generically a telephony device 901 and collectively a telephony device 901) in communication via a communication network 938, for example, a LAN and/or a corporate LAN. System 900 further comprises a communication network 939, for example the PSTN and/or a wireless network such as a cellular network and the like. A smartphone 950 can be in communication with communication network 939 via a link 952. Communication between telephony devices 901 and smartphone 950, can be facilitated via a central call controller 990, which can include, but is not limited to, a VoIP call controller. In general, central call controller 990 is in communication with communications network 939 via a link 999. Each telephony device 901 can be similar to at least one of calling telephony device 101, called telephony device 102 and phone 400. In particular non-limiting embodiments, each telephony device 901 comprises a corporate VoIP desk phone. Smartphone 950 can comprise a mobile phone running a softphone application. Furthermore, smartphone 950 can be associated with a mobile worker. In general, link 952 can be wireless, and link 999 can be wired or wireless as desired. For example, text data can be sent via a GPRS link (a data link that is defined within the GSM cellular network protocol), and the like, to smartphone 950 while voice can be transmitted via a standard cellular link. The GPRS link can be accessible by a 3$^{rd}$ party application thus enabling call controller 990 to send text data via link 952 whereas the voice data is setup via the PSTN as with cellular phone calls in general. Central call controller 990 can be similar to network element 190. In non-limiting exemplary embodiments, described below, a text call is initiated at smartphone 950 to telephony device 901a. The following steps occur:

i). At smartphone 950, the phone number for telephony device 901c can be determined via a phone book function.

ii). Smartphone 950 provides an option to initiate a text call.

iii). Smartphone 950 receives an indication that a text call is to be initiated. A query is made to central call controller 990, via links 952, 999, and communications network 939, to determine if telephony device 901a is able to process text calls. If it isn't, a message is displayed at Smartphone 950 indicating that telephony device 901a is unable to process text calls. Smartphone 950 then provides an option of placing a regular phone call or alternatively entering a text message to send, without a phone call, via an instant messaging (IM) or e-mail client, for example to an IM or e-mail address associated with telephony device 901a and/or a user of telephony device 901a.

iv). If telephony device 901a is able to process text calls, smartphone 950 presents a text entry area, similar to text entry box 510, where text data can be received using, for example, a keyboard and/or keypad at smartphone 950. Once receipt of text data is completed, the text call is initiated at smartphone 950 by transmitting text data and digital voice data to central call controller 990.

v). The text call is set up by central call controller 990 and a control path 992 is established between smartphone 950 and telephony device 901a, via central call controller 990. Central call controller 990 controls telephony device 901a via control path 990 such that a media/voice path 994 is set up directly between smartphone 950 and telephony device 901a. The text message data is transmitted via control path 994 from smartphone 950 to telephony device 901a, through the central call controller 990. This enables central call controller 990 to store the text data for call history tracking purposes. It also enables the text data to be sent to two different endpoints if a user's call routing settings set up within the central call controller 990 have incoming calls presented to two different devices at the same time (e.g. telephony device 901a and a cell phone). The protocol used to set-up the call can be generally enabled to permit transmission of the text data from smartphone 950 to telephony device 901a in a manner to that used for CLID data.

vi). When the text data arrives at telephony device 901a, an annunciator at telephony device 901a announces the call (i.e. telephony device 901a begins ringing) and provides the CLID data plus the text data. In some embodiments, media/voice path 994 is established after the call is answered. In other embodiments, if the call is not answered, then call controller 990 can et up a voice path to a centralized voicemail server (not depicted).

vii). In some embodiments, along with the text data provided at telephony device 901a, telephony device 901a can provide pre-configured text responses (e.g. "I will call you back") that can be selected and transmitted back to smartphone 950; the text response is then provided at smartphone 950.

Display and Storage of Text Calls on Various Devices

Figure 10:
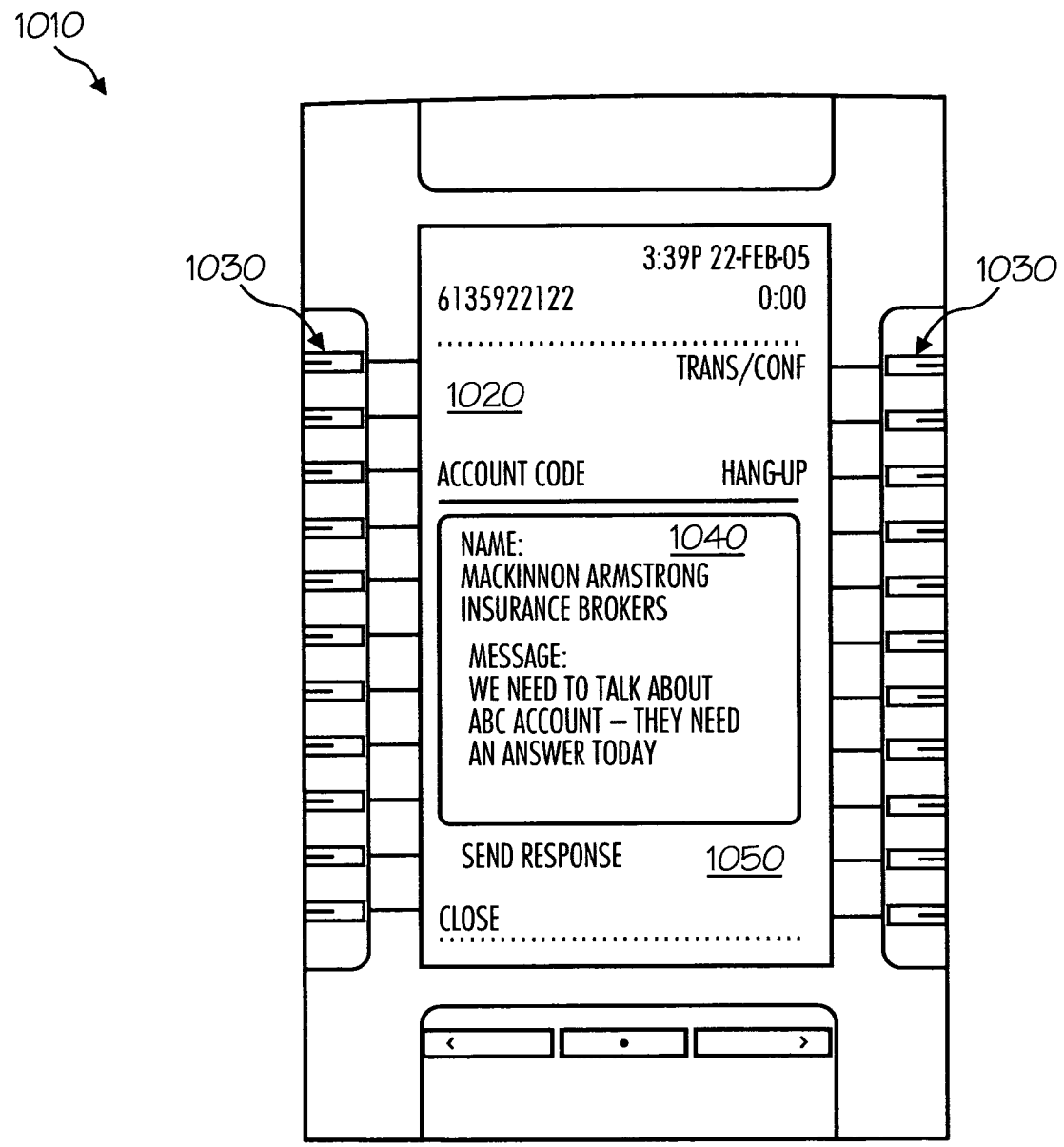
FIGS. 10 and 11 depict a display device of a telephony device for enhancing digital voice call initiation between a calling telephony device and a called telephony device, according to non-limiting embodiments.

The provision of the text annotation for a text call will vary by the capabilities of a device providing the text data, and the available real estate of a display device at the device. For example, when text data is being displayed on display device of a personal computer, e.g. via a desk phone companion or soft phone application, a lot more text can be displayed at a time versus at a display device of a desk or mobile phone. FIG. 10 depicts non-limiting exemplary embodiments of a display device 1010 of a deskphone, display device 1010 comprising a display screen 1020 and buttons 1030. It is understood that display device 1010 is controlled by a processing unit, similar to processing unit 111, which is further connected to any suitable number of speakers, microphones, input devices, communication interfaces, annunciator etc., at the desk phone.

When a text call is initiated, display screen 1020 can be controlled to provide a pop-up window 1040 within which text data associated with the text call is provided (e.g. "Message"), along with CLID data (e.g. "Name"). A similar pop-up window can be displayed from within a PC based desk phone companion or soft phone application. Given the available screen real estate at a PC, the amount of text data viewable without having to scroll could be much greater than on a desk or mobile phone.

Figure 11:
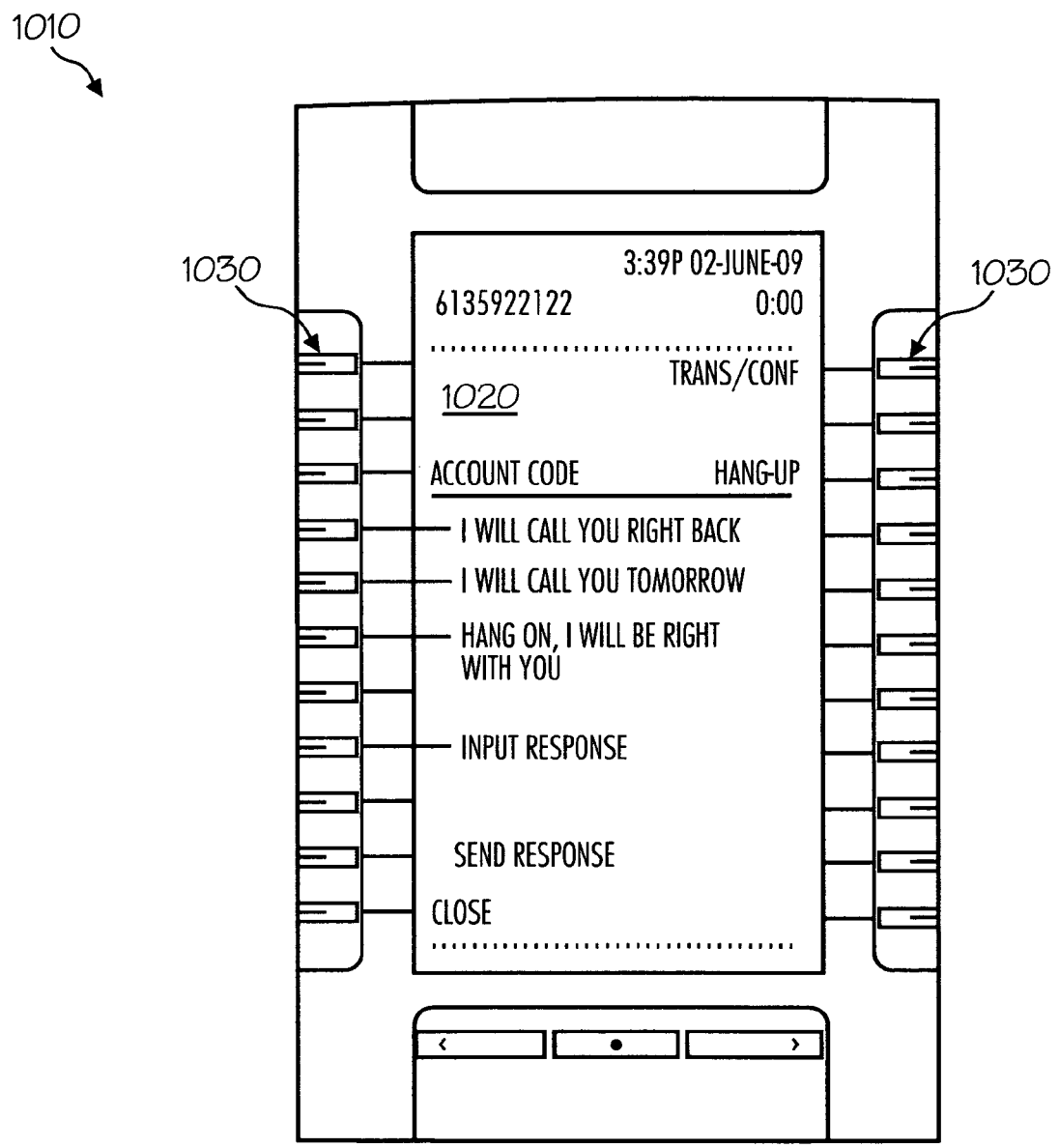

When an incoming text call is received, a send response soft button 1050 can be actuated via an adjacent button 1030, and display screen 1020 can be controlled to present a set of pre-configured text responses that can be invoked and transmitted back to a calling telephony device while the call is still ringing. For, example, as depicted in FIG. 11, the set of pre-configured text responses can include, but is not limited to, text responses such as, "I will call you right back", or "I will call you tomorrow" or "Hang on, I will be right with you". When input data received indicating that a given pre-configured text response has been selected (e.g. an adjacent button 1030 has been actuated) the selected pre-configured text response can be transmitted back to the calling device and displayed thereupon. In some embodiments, when input data is received indicating that the "Hang on, I will be right with you" (or the equivalent) has been selected, the processing unit can cause the voice call to be answered automatically and placed on hold until the called party picks it up.

Those skilled in the art will appreciate that in some embodiments, the functionality of telephony device 101, telephony device 102, deskphone 400, telephony devices 601, 701, 801, 901, deskphone comprising display device 1010, call controllers 690, 790, 890, 990, computing devices 750, 850 and smartphone 950 can be implemented using pre-programmed hardware or firmware elements (e.g., application specific integrated circuits (ASICs), electrically erasable programmable read-only memories (EEPROMs), etc.), or other related components. In other embodiments, the functionality of telephony device 101, telephony device 102, desk phone 400, telephony devices 601, 701, 801, 901, deskphone comprising display device 1010, call controllers 690, 790, 890, 990, computing devices 750, 850 and smartphone 950 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for enhancing digital voice call initiation between a first telephony device and a second telephony device, during said voice call initiation there between, said method comprising:
   determining whether the second telephony device is able to process text calls and, if not, providing an option to send a text message, without initiating a voice call, via an instant messaging or email client;
   if it is determined that the second telephony device is able to process text calls, associating text data with digital voice data conveyed between said first telephony device and said second telephony device, said associating occurring prior to initiating transmitting said digital voice data, said text data based on input data received via an input device associated with said first telephony device; and
   transmitting said text data to said second telephony device in conjunction with transmitting said digital voice data, said text data to be provided synchronously at said second telephony device with an announcement of said digital voice data.

2. The method of claim 1, wherein said input data comprises at least one of said text data and data for retrieving said text data from a memory.

3. The method of claim 1, wherein if it is determined that the second telephony device is unable to process text calls, controlling a display device at said first telephony device to provide a representation of such.

4. The method of claim 1, further comprising, after transmitting said text data, receiving an indication that said text data was at least one of not delivered and not provided at said second telephony device and, in response, controlling a display device at said first telephony device to provide a representation of said indication.

5. The method of claim 1, wherein said first telephony device and said second telephony device each comprise a respective voice communication application and a respective instant message messaging application, said text data exchanged between said respective instant message messaging applications under control by said respective voice communication application.

6. The method of claim 1, further comprising receiving a text reply to said text data, from said second telephony device.

7. The method of claim 1, wherein said transmitting said digital voice data occurs via a first communication path and said transmitting said text data occurs via a second communication path.

8. The method of claim 1, wherein said digital voice data is transmitted via a packetized voice protocol.

9. The method of claim 1, wherein said text data comprises at least one keyword, said at least one keyword used to route said digital voice data.

10. The method of claim 1, wherein said transmitting said text data comprises transmitting said text data within an e-mail in a unified messaging system.

11. A first telephony device for enhancing digital voice call initiation with a second telephony device, said first telephony device comprising:
   a processing unit interconnected with a communication interface, an input device, a memory, an annunciator and a display device, said processing unit enabled to:
   determine whether the second telephony device is able to process text calls and, if not, provide an option to send a text message, without initiating a voice call, via an instant messaging or email client;
   if it is determined that the second telephony device is able to process text calls, associate text data with digital voice data conveyed between said first telephony device and said second telephony device, said association occurring prior to initiating transmitting said digital voice data, said text data based on input data received via an input device associated with said first telephony device; and
   transmit said text data to said second telephony device in conjunction with transmitting said digital voice data, said text data to be provided synchronously at said second telephony device with an announcement of said digital voice data at said annunciator.

12. The first telephony device of claim 11, wherein said processing unit is further enabled to automatically transmit text data to said second telephony device when an incoming call from said second telephony device is detected at said first telephony device.

13. A system of claim 11 having a first telephony device for enhancing digital voice call initiation with a second telephony device, said second telephony device comprising:
   a processing unit interconnected with a communication interface, an input device, a memory, at least one annunciator, and a display device, said second telephony device processing unit enabled to:
   receive digital voice data from said first telephony device;
   receive said text data from said first telephony device; and
   synchronously control said display device to provide a representation of said text data and control said annunciator to announce reception of said digital voice data.

14. The system of claim 13 having a first telephony device for enhancing digital voice call initiation with a second telephony device, said second telephony device processing unit further enabled to store said text data in at least one of said memory and a memory of a voice message system, in association with at least one of data associated with a digital voice connection and voice message data.

15. The system of claim 13 having a first telephony device for enhancing digital voice call initiation with a second telephony device, said second telephony device processing unit further enabled to transmit reply text back to said first telephony device in response to receiving said text data, independent of completing a digital voice connection with said first telephony device.

16. The system of claim 13 having a first telephony device for enhancing digital voice call initiation with a second telephony device, said second telephony device processing unit is further enabled to detect keywords within said text data and at least one of route a call based on said keywords and control said annunciator based on said keywords.

17. The system of claim 13 having a first telephony device for enhancing digital voice call initiation with a second telephony device, said second telephony device processing unit is further enabled to convert said text data to voice data and to control said annunciator to announce reception of said digital voice data by playing said voice data.

\* \* \* \* \*